US008714491B2

(12) United States Patent
Simon et al.

(10) Patent No.: US 8,714,491 B2
(45) Date of Patent: May 6, 2014

(54) THERMAL PROTECTION SYSTEM WITH STAGGERED JOINTS

(75) Inventors: Xavier D. Simon, Aliso Viejo, CA (US);
Michael J. Robinson, Huntington Beach, CA (US); Thomas L. Andrews, Newport Beach, CA (US)

(73) Assignee: The Boeing Company, Chicago, IL (US)

( * ) Notice: Subject to any disclaimer, the term of this patent is extended or adjusted under 35 U.S.C. 154(b) by 1558 days.

(21) Appl. No.: 11/864,619

(22) Filed: Sep. 28, 2007

(65) Prior Publication Data

US 2009/0084902 A1 Apr. 2, 2009

(51) Int. Cl.
*B64G 1/58* (2006.01)

(52) U.S. Cl.
USPC .......................................... 244/159.1

(58) Field of Classification Search
USPC ............... 244/158.1, 158.9; 52/387, 391–392
See application file for complete search history.

(56) References Cited

U.S. PATENT DOCUMENTS

| | | | | |
|---|---|---|---|---|
| 2,999,431 A * | 9/1961 | Mitchell | ........................ | 472/92 |
| 3,130,940 A * | 4/1964 | Erb et al. | .................... | 244/159.1 |
| 4,124,732 A * | 11/1978 | Leger | ............................... | 428/77 |
| 4,151,800 A * | 5/1979 | Dotts et al. | ................. | 244/159.1 |
| 4,287,693 A * | 9/1981 | Collette | ........................... | 52/177 |
| 5,052,158 A * | 10/1991 | D'Luzansky | .................. | 52/177 |
| 5,212,842 A * | 5/1993 | Glydon | ............................. | 5/420 |
| 5,511,747 A * | 4/1996 | Parrot et al. | ................ | 244/159.1 |
| 5,560,569 A * | 10/1996 | Schmidt | .................... | 244/117 R |
| 5,772,154 A * | 6/1998 | Stewart | ..................... | 244/159.1 |
| 5,803,406 A * | 9/1998 | Kolodziej et al. | .......... | 244/171.7 |
| 6,073,929 A * | 6/2000 | Nahon | ......................... | 273/156 |
| 6,640,513 B2 * | 11/2003 | Ku | ............................... | 52/589.1 |
| 6,769,835 B2 * | 8/2004 | Stridsman | ...................... | 404/41 |
| 2002/0189183 A1 * | 12/2002 | Ricciardelli | .................... | 52/390 |
| 2003/0091780 A1 * | 5/2003 | Andersson | ...................... | 428/62 |

* cited by examiner

*Primary Examiner* — Tien Dinh
(74) *Attorney, Agent, or Firm* — Smith Moore Leatherwood LLP

(57) ABSTRACT

The thermal protection system disclosed herein is suitable for use with a spacecraft such as a reentry module or vehicle, where the spacecraft has a convex surface to be protected. An embodiment of the thermal protection system includes a plurality of heat resistant panels, each having an outer surface configured for exposure to atmosphere, an inner surface opposite the outer surface and configured for attachment to the convex surface of the spacecraft, and a joint edge defined between the outer surface and the inner surface. The joint edges of adjacent ones of the heat resistant panels are configured to mate with each other to form staggered joints that run between the peak of the convex surface and the base section of the convex surface.

23 Claims, 5 Drawing Sheets

THERMAL PROTECTION SYSTEM WITH STAGGERED JOINTS

STATEMENT REGARDING FEDERALLY SPONSORED RESEARCH OR DEVELOPMENT

The invention described herein was made in the performance of work under NASA Contract number NNA06BC75C and is subject to the provisions of Section 305 of the National Aeronautics and Space Act of 1958 (72 Stat. 435: 42 U.S.C. 2457).

TECHNICAL FIELD

Embodiments of the subject matter described herein relate generally to thermal protection systems of the type utilized with space reentry modules. More particularly, embodiments of the subject matter relate to thermal protection panels that mate to form staggered joints between the panels.

BACKGROUND

A variety of thermal protection systems, heat shields used in aviation and space applications, and heat resistant materials are known. A heat shield for a space reentry vehicle represents one particularly rigorous application for heat resistant material and a thermal protection system, due to the extremely high temperature and extended period of time during which the reentry vehicle is exposed to the high temperature. The reentry capsules for the Apollo space missions utilized such heat shields, the Space Shuttle utilizes thousands of heat resistant ceramic tiles for its thermal protection system, and the reentry capsule for the Crew Exploration Vehicle to be deployed in the future will employ such a thermal protection system.

During reentry from space, a capsule ballistically travels through the atmosphere with its blunt lower surface aligned as the leading section, as depicted in FIG. 1. The lower surface of the spacecraft 100 is protected by a heat shield 102, which absorbs the thermal energy generated during deceleration of the spacecraft 100. Traditionally, heat shields have been formed from an ablator material in a one-piece composite composition that covered the protected surface. The Apollo capsules, for example, used a honeycomb core filled with an ablative material. It may be desirable to instead use an ablative heat shield configuration that includes a plurality of cooperating heat shield panels or elements that are mated together and attached to the surface to be protected.

BRIEF SUMMARY

Thermal protection systems and a method of installing a thermal protection system on a spacecraft are described herein. The thermal protection systems are suitable for use with a space reentry vehicle or capsule.

An embodiment of a thermal protection system includes at least a first heat resistant panel and a second heat resistant panel. The first heat resistant panel has a first panel outer surface configured for exposure to atmosphere, a first panel inner surface opposite the first panel outer surface and configured for attachment to a surface to be protected, and a first panel joint edge defined between the first panel outer surface and the first panel inner surface. Likewise, the second heat resistant panel has a second panel outer surface configured for exposure to atmosphere, a second panel inner surface opposite the second panel outer surface and configured for attachment to the surface to be protected, and a second panel joint edge defined between the second panel outer surface and the second panel inner surface. The first panel joint edge and the second panel joint edge are configured to mate with each other to form a staggered joint between the first heat resistant panel and the second heat resistant panel.

An embodiment of a method of installing a thermal protection system on a spacecraft involves: providing a first heat resistant panel having a first panel outer surface configured for exposure to atmosphere, a first panel inner surface opposite the first panel outer surface, and a first panel joint edge defined between the first panel outer surface and the first panel inner surface; providing a second heat resistant panel having a second panel outer surface configured for exposure to atmosphere, a second panel inner surface opposite the second panel outer surface, and a second panel joint edge defined between the second panel outer surface and the second panel inner surface; attaching the first panel inner surface to a surface of the spacecraft; attaching the second panel inner surface to the surface of the spacecraft in a manner that creates a gap between the first panel joint edge and the second panel joint edge; and filling the gap with a heat resistant filler material to define a staggered joint between the first heat resistant panel and the second heat resistant panel.

Another embodiment of a thermal protection system is suitable for use with a spacecraft having a convex surface to be protected, the convex surface having a peak and a base section. The thermal protection system includes a plurality of heat resistant panels, each having an outer surface configured for exposure to atmosphere, an inner surface opposite the outer surface and configured for attachment to the convex surface of the spacecraft, and a joint edge defined between the outer surface and the inner surface. The joint edges of adjacent ones of the heat resistant panels are configured to mate with each other to form staggered joints that run from the peak of the convex surface to the base section of the convex surface.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

A more complete understanding of the subject matter may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the embodiments of the invention or the application and uses of such embodiments. Furthermore, there is no intention to be bound by any expressed or implied theory presented in the preceding technical field, background, brief summary or the following detailed description. For the sake of brevity, conventional techniques and features related to spacecraft design, heat resistant materials and compositions, thermal protection systems and their manufacturing, and other aspects of the systems (and the individual operating components of the systems) may not be described in detail herein.

The following description may refer to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically.

The thermal protection system described herein can be utilized on a reusable, expendable, or refurbishable spacecraft, such as a reentry capsule, module, or on other vehicles that might be subjected to very high temperatures. In certain embodiments, the thermal protection system includes a plurality of panels formed from heat resistant ablator materials. These panels mate together to completely cover the protected surface of the spacecraft. Bonding the multiple panels together in this manner results in seams or joints between adjacent panels. The panel seam configurations described herein prevent unwanted overheating and erosion of the filler joint material by reducing airflow alignment along the seams. The joint edges of the individual thermal protection panels and the resulting joints formed between adjacent panels described herein are deliberately shaped to provide advantages over long straight seams. in order to minimize the potentially erosive effect of airflow aligning with the seams. The use of non-straight and non-uniform edge profiles may reduce overheating and premature joint erosion caused by the airflow during reentry.

Figure 1:
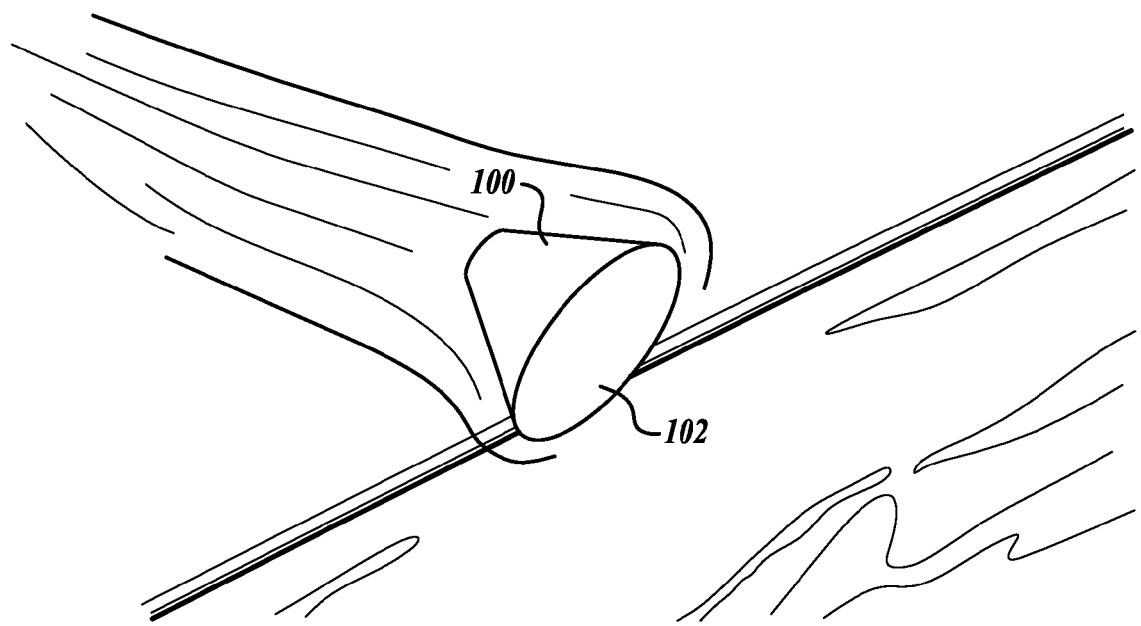
FIG. 1 is a diagram that depicts a spacecraft during reentry.
Figure 2:
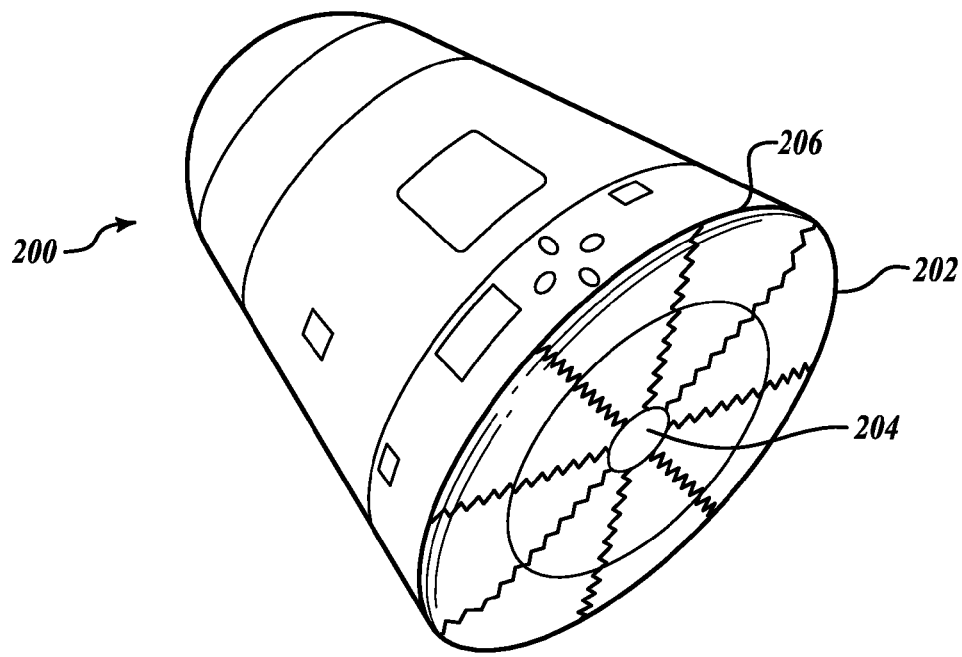
FIG. 2 is a bottom perspective view of a spacecraft that includes an embodiment of a thermal protection system.

FIG. 2 is a bottom perspective view of a spacecraft 200 that includes an embodiment of a thermal protection system (TPS) 202 affixed thereto. Referring to FIG. 1, TPS 202 functions as a heat shield to protect the forward section of spacecraft 200 (e.g., a reentry module) as it ballistically reenters the atmosphere on its return to Earth.

Figure 3:
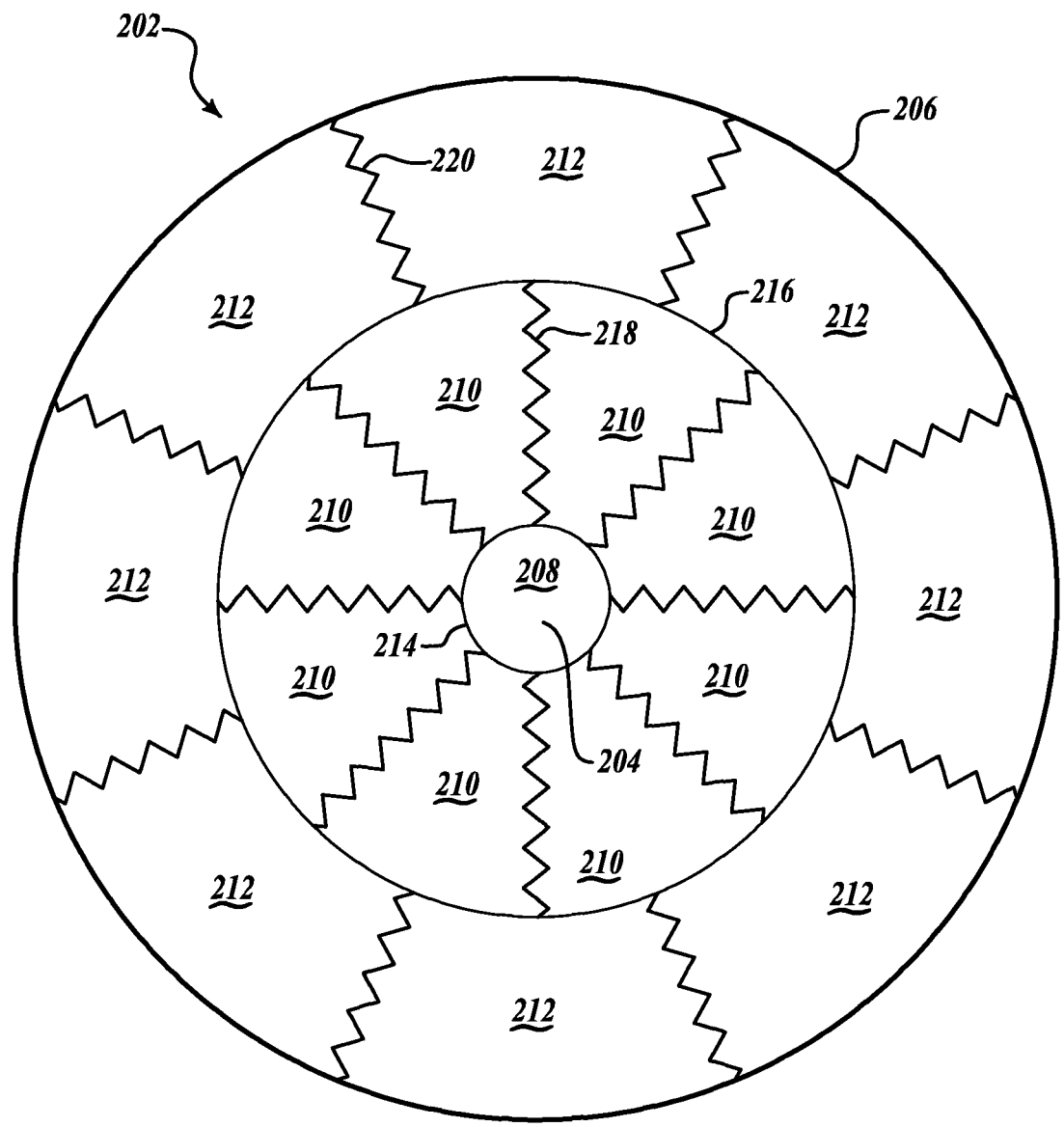
FIG. 3 is a bottom plan view of a spacecraft that includes an embodiment of a thermal protection system.

FIG. 3 is a bottom plan view of spacecraft 200 and, in particular, TPS 202 having a different panel layout. The protected surface of spacecraft 200 (hidden from view in FIG. 2 and FIG. 3) is a convex surface that tapers from a peak to a base section that generally corresponds to the outer perimeter of TPS 202. This overall convex surface is shown in FIG. 1 and FIG. 2, and is depicted schematically in exaggerated form in FIG. 4. FIG. 2 and FIG. 3 illustrate a peak 204 and a base section 206 of TPS 202, which correspond to the peak and base section of the protected surface, respectively. In the illustrated embodiment, base section 206 represents the projected circular perimeter of TPS 202, and peak 204 represents the center of this projected circular perimeter. This arrangement is depicted in FIG. 3.

For this embodiment, TPS 202 includes a plurality of heat resistant panels, including, without limitation: a center panel 208; inner panels 210; and outer panels 212. These panels are preferably formed from a heat resistant material, include a heat resistant material or composition, and/or comprise a heat resistant structure. For example, these panels may include or be formed from: heat resistant ceramic tiles; heat resistant adhesive material; an ablative heat resistant material; a composite construction capable of withstanding very high temperatures; ceramic derivatives; carbon derivatives; high temperature metallics such as iconel steel; or the like. A heat resistant panel may be formed from one solid and homogeneous material, a plurality of components, or the like. Indeed, these panels can utilize any suitable heat resistant material, technology, composition, and/or structure, many of which are well known to those familiar with thermal protection techniques and systems, and these panels can be fabricated in accordance with well known manufacturing processes that will not be described in detail here.

The layout of panels shown in FIG. 2 and FIG. 3 is merely one possible arrangement, and embodiments of TPS 202 are not limited to this particular layout. Each of these heat resistant panels has an outer surface configured for exposure to the atmosphere, an inner surface opposite the outer surface, and at least one joint edge that is defined between the outer surface and the inner surface. The inner surface is suitably configured for attachment to the protected surface of spacecraft 200—in practice, the inner surface is designed to facilitate attachment to the convex surface of spacecraft 200 via a heat resistant adhesive material, a high temperature bonding material, or the like. The inner surfaces and the joint edges are hidden from view in FIG. 2 and FIG. 3. However, FIG. 6 (which is a side view of one heat resistant panel) shows an upper surface 408, an inner surface 410, and a joint edge 412 therebetween.

Center panel 208 is shaped like a round cap in this embodiment. Center panel 208 covers the apex of the convex surface of spacecraft 200, and is centered in TPS 202. Inner panels 210 resemble pie shaped wedges arranged around center panel 208. For this particular embodiment, the length of inner panels 210 in the radial dimension may be about two to four feet. Each inner panel 210 includes an inward joint edge that is configured to mate with the perimeter of center panel 208, creating a joint 214 between inner panels 210 and center panel 208. Each inner panel 210 includes an outward joint edge that is configured to mate with a respective one of the outer panels 212, creating a joint 216 between inner panels 210 and outer panels 212. In FIG. 3, joint 214 corresponds to an inner circle defined by center panel 208, and joint 216 corresponds to an interior circle located between the inner circle and the outer perimeter of TPS 202. Each inner panel 210 also includes two side joint edges. Each side joint edge is suitably configured to mate with a corresponding side joint edge of an adjacent inner panel, creating a staggered joint 218 between the two adjacent inner panels 210. This particular embodiment has eight of these staggered joints 218, and FIG. 3 depicts staggered joints 218 as saw tooth shaped or zigzag shaped seams between the respective inner panels 210.

Outer panels 212 resemble segments of a ring, arranged around inner panels 210. For this particular embodiment, the length of outer panels 212 in the radial dimension may be about two to four feet. Each outer panel 212 includes an inward joint edge that is configured to mate with a respective one of the inner panels 210, creating joint 216 as described above. Each outer panel 212 includes an outward edge that represents the outer extent of TPS 202. Each outer panel 212 also includes two side joint edges. Each side joint edge is suitably configured to mate with a corresponding side joint edge of an adjacent outer panel, creating a staggered joint 220 between the two adjacent outer panels 212. This particular embodiment has eight of these staggered joints 220, and FIG. 3 depicts staggered joints 220 as saw tooth shaped or zigzag shaped seams between the respective outer panels 212. Notably, staggered joints 220 may be aligned with staggered joints 218 (as depicted in FIG. 2), or they may be discontinuous with staggered joints 218 (as depicted in FIG. 3).

Figure 4:
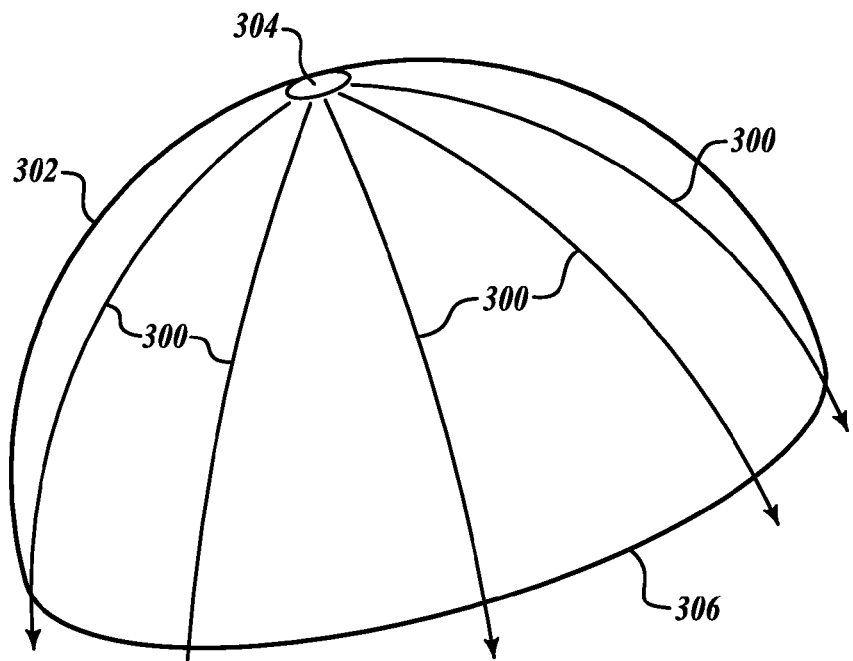
FIG. 4 is a diagram that depicts natural airflow paths over a convex surface.

Staggered joints 218 and 220 run between peak 204 and base section 206, and their overall orientation is in alignment with the natural airflow paths that are established during reentry of spacecraft 200. From the projected perspective of FIG. 3, these natural airflow paths can be conceptualized as outwardly directed radial lines. In this regard, FIG. 4 is a diagram that depicts natural airflow paths 300 over a convex surface 302 (such as the exposed surface of TPS 202). Again, these airflow paths 300 are directed from an apex 304 of convex surface 302 toward a base section 306 of convex surface. Indeed, this convex surface is suitably configured to accommodate this type of aerodynamic airflow. Airflow paths 300 correspond to paths of least resistance for fluid (e.g., air) traveling across convex surface 302, assuming that apex 304 is the leading point and that convex surface 302 has little or no pitch or yaw angle relative to the direction of travel. The staggered configuration impedes airflow magnification along staggered joints 218/220. Referring to FIG. 4, the staggered configuration reduces alignment and consolidation of airflow along the natural airflow paths 300, because each of the staggered joints 218/220 includes at least one non-straight segment. These non-straight segments prevent the flow stream from aligning and concentrating in a straight line, reducing erosion caused by overheating of the joint filler material. Thus, each of the staggered joints 218/220 is suitably configured to impede airflow from peak 204 to base section 206 along paths aligned with the natural airflow paths 300. In practice, the staggered joints are suitably arranged to reduce the length of the gap for which airflow is aligned with the gap.

Figure 5:
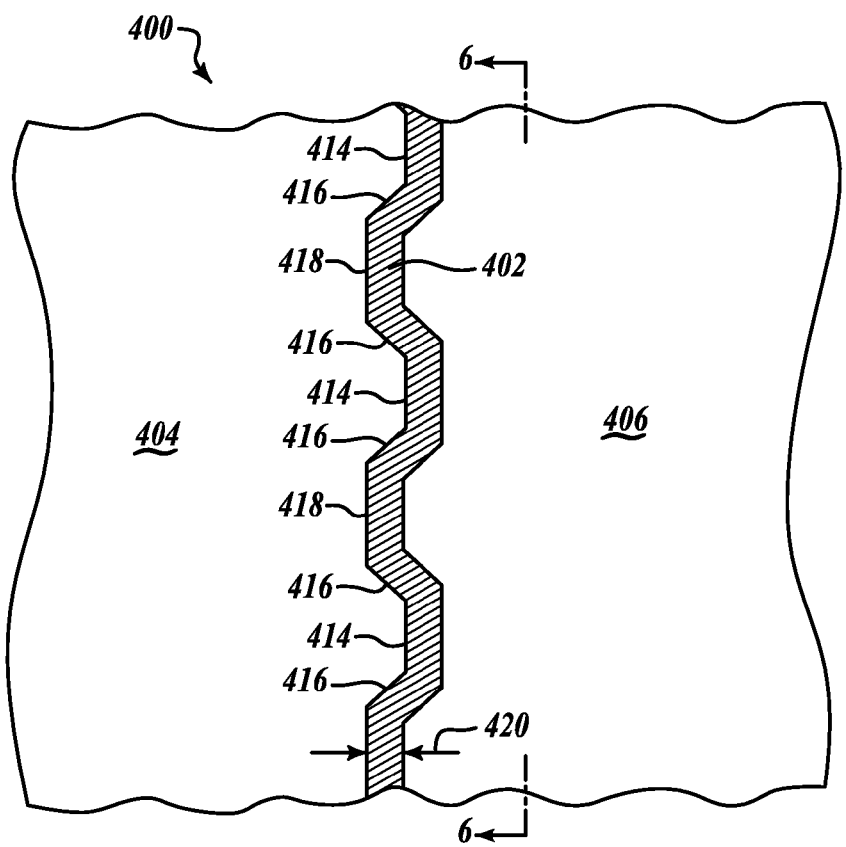
FIG. 5 is a plan view of a section of a thermal protection system that employs staggered joints.
Figure 7:
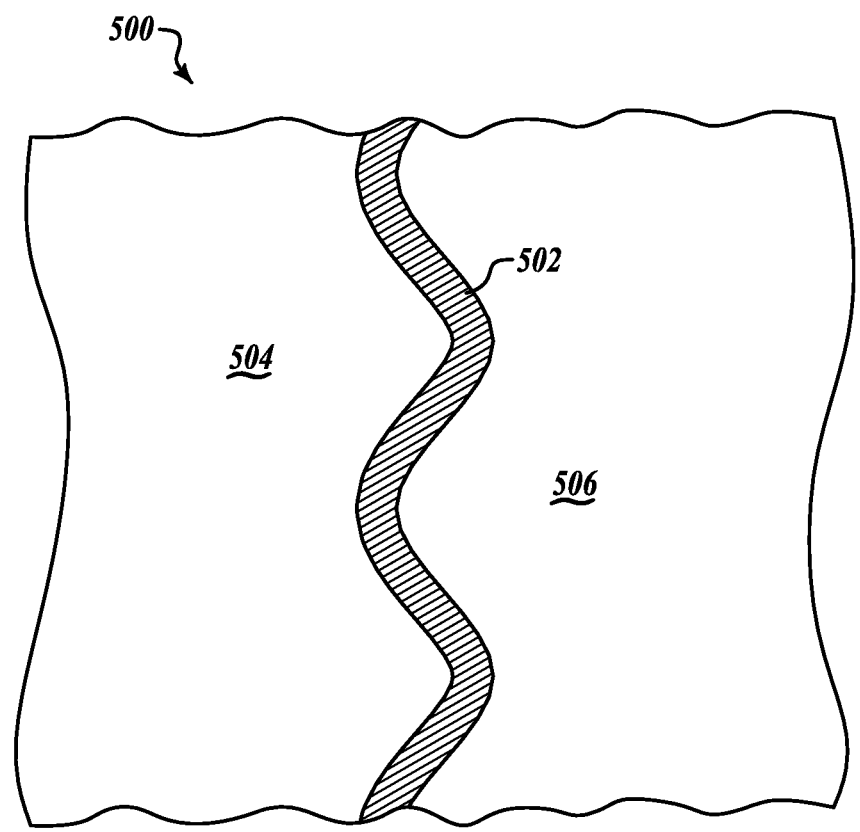
FIG. 7 is a plan view of a section of a thermal protection system that employs staggered joints.

As used here, a staggered joint can be of any shape, size, geometry, or configuration, as long as it includes at least one non-straight segment. In other words, a joint between two adjacent heat resistant panels should not be realized as a straight line. FIG. 3 depicts one embodiment where staggered joints 218/220 form saw tooth segments with no spacing between teeth. FIG. 5 is a plan view of a section of a TPS 400 that employs a staggered joint 402 having at least one saw tooth segment with spacing between adjacent teeth. The illustrated section of TPS 400 includes a first heat resistant panel 404 adjacent to a second heat resistant panel 406. FIG. 7 is a plan view of a section of another TPS 500 that employs a staggered joint 502 having at least one sine wave segment. The illustrated section of TPS 500 includes a first heat resistant panel 504 adjacent to a second heat resistant panel 506. Of course, an embodiment of a TPS as described herein may utilize staggered joint configurations other than those shown in the figures.

Figure 6:
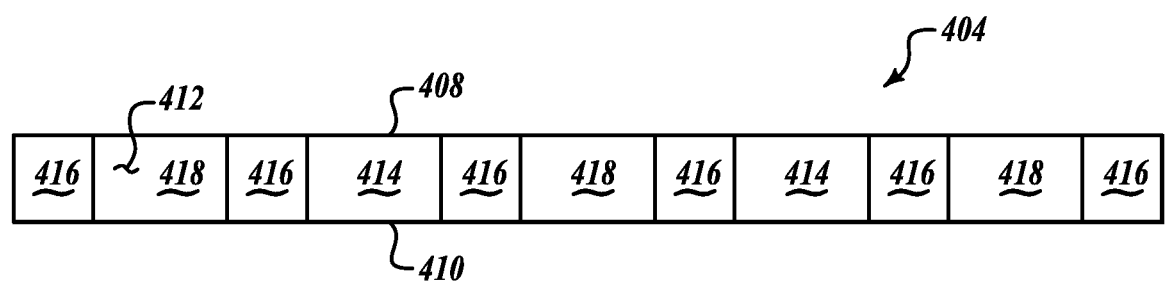
FIG. 6 is a side view of a panel of the thermal protection system as viewed from line 6-6 in FIG. 5.

FIG. 6 is a side view of heat resistant panel 404 as viewed from line 6-6 in FIG. 5. Like the other panels described herein, heat resistant panel 404 has an outer surface 408, an inner surface 410 opposite outer surface, and a joint edge 412 defined between outer surface 408 and inner surface 410. When deployed, outer surface 408 is exposed to the atmosphere, and inner surface 410 is attached to the surface to be protected. FIG. 6 depicts the tips 414 of the saw teeth, which are separated by angled sections 416 and flat sections 418. Referring also to FIG. 5, joint edge 412 (which is representative of the other staggered joint edges in the TPS) may be configured such that it is substantially normal to the protected surface. In other words, the wall formed by joint edge 412 is substantially perpendicular to the protected surface. In practice, the staggered joint edges of two adjacent panels are maintained in a slightly spaced apart manner to form a gap between the adjacent panels. FIG. 5 depicts this gap 420 in an exaggerated manner for ease of illustration. In certain embodiments, the width of gap 420 can be within the range of 0.03 to 0.25 inch. In preferred embodiments, the width of gap 420 is about 0.0625 inch. During fabrication of the TPS, gap 420 is filled with a suitable heat resistant filler material. In this regard, the heat resistant filler material defines the staggered joints.

Referring again to FIG. 5 and FIG. 7, the dimensions of the staggered features, and the number of staggered features per unit length are selected to effectively disrupt airflow alignment along the staggered joints. In practice, the dimensions of the staggered features and the number of staggered features per unit length may also be selected to accommodate testing of panel designs and/or to facilitate ease of manufacture and assembly. For example, existing high temperature airflow testing equipment for such heat resistant panels may not be able to accommodate test panels that are larger than twelve-by-twelve inches. Consequently, a twelve-by-twelve inch test panel ought to include at least one staggered feature (e.g., one saw tooth cycle, or one sine wave). Although having more staggered features per unit length may be desirable to better impede airflow concentration along the staggered joint, increasing the number of staggered features may result in more complex manufacturing and assembly procedures.

Referring again to FIG. 3, joint 214 and joint 216 need not be staggered as described above for the seams that generally run in the direction of the natural airflow paths. This embodiment is based on the assumption that the natural airflow across TPS 202 will be approximately perpendicular over joint 214 and joint 216 and, therefore, the natural airflow will not concentrate along or within these joints. Thus, the panels of TPS 202 need not include staggered joint edges corresponding to joint 214 or joint 216. Other embodiments of this concept may be optimized for different airflow patterns across the heatshield.

Figure 8:
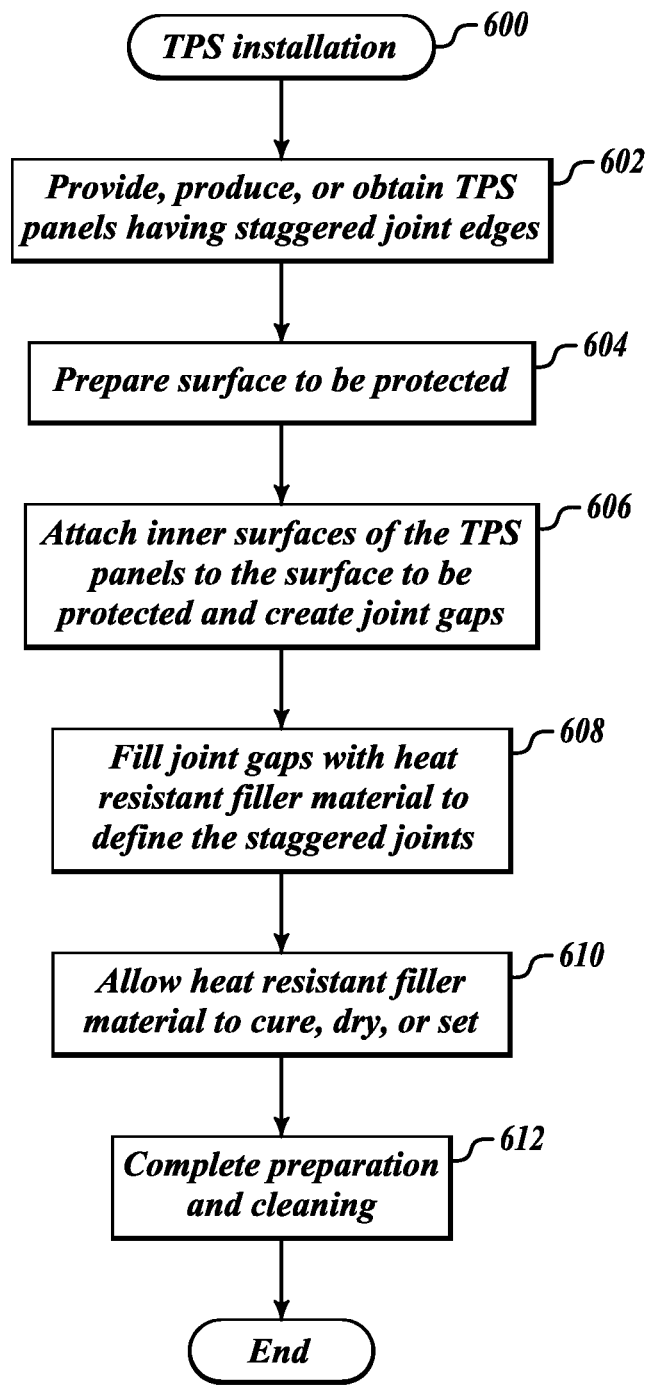
FIG. 8 is a flow chart that illustrates an embodiment of an installation process for a thermal protection system.

FIG. 8 is a flow chart that illustrates an embodiment of an installation process 600 for a TPS. Process 600 is described in the context of a typical installation on a spacecraft such as a reentry module or vehicle. For illustrative purposes, the following description of process 600 may refer to elements mentioned above in connection with FIGS. 1-7. In practice, process 600 may include any number of additional or alternative tasks, the tasks shown in FIG. 8 need not be performed in the illustrated order, and process 600 may be incorporated into a more comprehensive procedure or process having additional functionality not described in detail herein.

TPS installation process 600 may begin by providing, producing, or obtaining TPS panels (task 602) of the type described in more detail above, i.e., TPS panels having staggered joint edges. In certain embodiments, the staggered joint edge features can be fabricated as inherent and integrated features during the creation of the TPS panels. Alternatively, the staggered joint edge features can be formed (e.g., but cutting, grinding, sawing, etc.) in TPS panels having straight joint edges. Process 600 also prepares the surface to be protected (task 604) so that the TPS panels can be affixed to the surface. Task 604 may involve cleaning, heating, sanding, and/or other manipulation of the surface. The inner surfaces of the TPS panels may also be suitably prepared for attachment to the surface to be protected. Thereafter, the inner surfaces of the TPS panels are attached to the surface to be protected (task 606). During task 606, an appropriate high temperature and heat resistant filler material can be used to attach the TPS panels to the surface of the spacecraft. The TPS panels are preferably installed such that joint gaps remain between adjacent staggered joint edges. The TPS panels are installed in an appropriate arrangement such that the staggered joints run in the desired orientation and direction between the peak and base section of the protected convex surface as described above.

The TPS panels are installed while intentionally leaving a gap width of about 0.0625 between adjacent staggered joint edges. Eventually, TPS installation process 600 fills the joint gaps with an appropriate heat resistant filler material to define the staggered joints between adjacent TPS panels (task 608). Task 608 is akin to a tile grouting procedure. Although not a requirement, the filler material used during task 608 will typically be the same filler material used during task 606. It should be appreciated that task 606 and task 608 can be combined into a single fabrication step where the joint gaps are naturally filled with excess filler material as the TPS panels are pressed into place. In connection with task 606 and/or task 608, the filler material may be left to cure, dry, or set, with or without applied heat (task 610). As a final step, process 600 might complete preparation, perform cleaning, and perform inspection of the TPS system on the spacecraft (task 612).

While at least one example embodiment has been presented in the foregoing detailed description, it should be appreciated that a vast number of variations exist. It should also be appreciated that the example embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A thermal protection system comprising:
    a first heat resistant panel having a first panel outer surface that can withstand exposure to atmospheric ballistic reentry temperatures, a first panel inner surface opposite the first panel outer surface and configured for attachment to a surface to be protected, and a first panel joint edge defined between the first panel outer surface and the first panel inner surface; and
    a second heat resistant panel having a second panel outer surface that can withstand exposure to atmospheric ballistic reentry temperatures, a second panel inner surface opposite the second panel outer surface and configured for attachment to the surface to be protected, and a second panel joint edge defined between the second panel outer surface and the second panel inner surface; wherein
    the first panel inner surface and second panel inner surface are configured for attachment to the surface to be protected such that the first panel joint edge and the second panel joint edge are normal to the surface to be protected; wherein
    the first panel joint edge and the second panel joint edge are configured to mate with each other to form a staggered joint between the first heat resistant panel and the second heat resistant panel; and wherein
    the staggered joint comprises at least one non-straight segment having a periodic shape extending parallel to the first and second panel outer surfaces for at least one cycle of the periodic shape.

2. The thermal protection system of claim 1, wherein the at least one non-straight segment is not in alignment with ballistic airflow over the first and second heat resistant panels.

3. The thermal protection system of claim 1, the first panel joint edge and the second panel joint edge being configured to reduce a length of a gap for which airflow is aligned with the gap.

4. The thermal protection system of claim 1, further comprising a heat resistant filler material between the first panel joint edge and the second panel joint edge, the heat resistant filler material defining the staggered joint.

5. The thermal protection system of claim 1, the at least one non-straight segment having a periodic sinusoidal shape.

6. The thermal protection system of claim 1, wherein:
    the surface to be protected is a convex surface of a spacecraft, the convex surface having a peak and a base section;
    the first heat resistant panel and second heat resistant panel are of a plurality of heat resistant panels configured for attachment to the convex surface, the plurality of heat resistant panels having respective outer surfaces configured for exposure to atmosphere; and
    the staggered joint being of a plurality of staggered joints that run between the peak and base section of the convex surface when the plurality of heat resistant panels are attached to the convex surface.

7. The thermal protection system of claim 1, the at least one non-straight segment having a periodic sawtoothed or zigzagged shape 8. A spacecraft comprising:
    a protected surface; and
    a thermal protection system coupled to the protected surface, the thermal protection system comprising:
        a first heat resistant panel having a first panel outer surface that can withstand exposure to atmospheric ballistic reentry temperatures, a first panel inner surface opposite the first panel outer surface and configured for attachment to the protected surface, and a first panel joint edge defined between the first panel outer surface and the first panel inner surface; and
        a second heat resistant panel having a second panel outer surface that can withstand exposure to atmospheric ballistic reentry temperatures, a second panel inner surface opposite the second panel outer surface and configured for attachment to the protected surface, and a second panel joint edge defined between the second panel outer surface and the second panel inner surface; wherein
        the first panel inner surface and second panel inner surface are configured for attachment to the protected surface such that the first panel joint edge and the second panel joint edge are normal to the protected surface; wherein
        the first panel joint edge and the second panel joint edge are configured to mate with each other to form a staggered joint between the first heat resistant panel and the second heat resistant panel; and wherein
        the staggered joint comprises at least one non-straight segment having a periodic shape and extending parallel to the first and second panel outer surfaces for at least one cycle of the periodic shape.

9. The spacecraft of claim 8, wherein:
    the protected surface is a convex surface having a peak and a base section;
    the first heat resistant panel and second heat resistant panel are of a plurality of heat resistant panels coupled to the convex surface, the plurality of heat resistant panels having respective outer surfaces configured for exposure to atmosphere; and the staggered joint is of a plurality of staggered joints that run between the peak and base section of the convex surface.

10. The spacecraft of claim 9, each of the plurality of staggered joints comprising at least one non-straight segment.

11. The spacecraft of claim 9, the plurality of staggered joints being configured to reduce a length of a gap for which airflow is aligned with the gap from the peak of the convex surface to the base section of the convex surface.

12. The spacecraft of claim 9, wherein:
the plurality of heat resistant panels have a respective plurality of joint edges, the joint edges of adjacent ones of the plurality of heat resistant panels being configured to mate with each other to form the plurality of staggered joints; and
the spacecraft further comprises a heat resistant filler material between joint edges of the plurality of joint edges, the heat resistant filler material defining the plurality of staggered joints.

13. The spacecraft of claim 9, wherein:
the convex surface of the spacecraft is configured to accommodate airflow from the peak to the base section; and
the plurality of staggered joints are overall aligned with paths of airflow.

14. The spacecraft of claim 9, wherein;
the spacecraft is a reentry capsule; and
the heat resistant panels cooperate to form a heat shield for the convex surface of the reentry capsule.

15. The spacecraft of claim 9, the heat resistant panels being formed from an ablative heat resistant material.

16. The spacecraft of claim 8, the at least one non-straight segment having a periodic sinusoidal shape.

17. The spacecraft of claim 8, the at least one non-straight segment having a periodic sawtoothed or zigzagged shape.

18. A method of installing a thermal protection system, the method comprising:
attaching a first heat resistant panel to a surface to be protected, the first heat resistant panel having a first panel outer surface that can withstand exposure to atmospheric ballistic reentry temperatures, a first panel inner surface opposite the first panel outer surface and configured for attachment to the surface to be protected, and a first panel joint edge defined between the first panel outer surface and the first panel inner surface; and
attaching a second heat resistant panel to the surface to be protected, the second heat resistant panel having a second panel outer surface that can withstand exposure to atmospheric ballistic reentry temperatures, a second panel inner surface opposite the second panel outer surface and configured for attachment to the surface to be protected, and a second panel joint edge defined between the second panel outer surface and the second panel inner surface; wherein the first heat resistant panel and second heat resistant panel are attached to the surface to be protected such that the first panel joint edge and the second panel joint edge are normal to the surface to be protected; wherein the first panel joint edge and the second panel joint edge are configured to mate with each other to form a staggered joint between the first heat resistant panel and the second heat resistant panel; and wherein the staggered joint comprises at least one non-straight segment having a periodic shape and extending parallel to the first and second panel outer surfaces for at least one cycle of the periodic shape.

19. The method of claim 18, wherein:
the second heat resistant panel is attached to the surface to be protected in a manner that creates a gap between the first panel joint edge and the second panel joint edge; and
the method further comprises filling the gap with a heat resistant filler material to define the staggered joint between the first heat resistant panel and the second heat resistant panel.

20. The method of claim 18, wherein:
the surface to be protected is a convex surface of a spacecraft, the convex surface having a peak and a base section;
attaching the first heat resistant panel comprises attaching the first heat resistant panel such that the first panel joint edge runs between the peak and the base section; and
attaching the second heat resistant panel comprises attaching the second heat resistant panel such that the second panel joint edge runs between the peak and the base section.

21. The method of claim 18, the first panel joint edge and the second panel joint edge being configured to minimize a length of a gap for which airflow is aligned with the gap.

22. The method of claim 18, the at least one non-straight segment having a periodic sinusoidal shape.

23. The method of claim 18, the at least one non-straight segment having a periodic sawtoothed or zigzagged shape.

* * * * *